US012785282B2

(12) United States Patent
Young

(10) Patent No.: US 12,785,282 B2
(45) Date of Patent: Nov. 3, 2026

(54) DUAL-POLARIZED ULTRA-WIDEBAND TAPERED SLOT ANTENNA ARRAY WITH INTEGRATED FEED

(71) Applicant: THE BOEING COMPANY, Arlington, VA (US)

(72) Inventor: Stephen J. Young, Seattle, WA (US)

(73) Assignee: The Boeing Company, Arlington, VA (US)

(*) Notice: Subject to any disclaimer, the term of this patent is extended or adjusted under 35 U.S.C. 154(b) by 176 days.

(21) Appl. No.: 18/517,410

(22) Filed: Nov. 22, 2023

(65) Prior Publication Data

US 2025/0167455 A1 May 22, 2025

(51) Int. Cl.

| | |
|---|---|
| ***H01Q 13/08*** | (2006.01) |
| ***H01Q 13/10*** | (2006.01) |
| ***H01Q 21/24*** | (2006.01) |

(52) U.S. Cl.
CPC ......... *H01Q 13/085* (2013.01); *H01Q 13/106* (2013.01); *H01Q 21/24* (2013.01)

(58) Field of Classification Search
CPC ..... H01Q 13/085; H01Q 13/106; H01Q 21/24
See application file for complete search history.

(56) References Cited

U.S. PATENT DOCUMENTS

| | | | | |
|---|---|---|---|---|
| 6,891,511 | B1 * | 5/2005 | Angelucci | H01Q 21/064 343/770 |
| 8,350,773 | B1 | 1/2013 | Kindt | |
| 2021/0376463 | A1 * | 12/2021 | Massman | H01Q 5/25 |
| 2022/0368000 | A1 * | 11/2022 | Hollenbeck | H01Q 21/0037 |

OTHER PUBLICATIONS

J. B. Yan and S. Gogineni, "A mechanically robust modular vivaldi array panel for ultra-wideband sensing applications," 2017 IEEE International Symposium on Antennas and Propagation & USNC/URSI National Radio Science Meeting, San Diego, CA, USA, 2017, pp. 1813-1814, doi:10.1109/APUSNCURSINRSM.2017.8072949.

R. Kindt and R. Pickles, "12-to-1 bandwidth all-metal Vivaldi array element," 2009 IEEE Antennas and Propagation Society International Symposium, North Charleston, Sc, USA, 2009, pp. 1-4, doi: 10.1109/APS.2009.5171599.

* cited by examiner

*Primary Examiner* — Amal Patel
(74) *Attorney, Agent, or Firm* — Harrity & Harrity, LLP

(57) ABSTRACT

The present disclosure provides an antenna array, a tapered slot antenna element, and an antenna panel. The antenna array includes a plurality of antenna panels each comprising, respectively: a substantially planar base section, and at least one tapered slot antenna element projecting in a direction away from an extent of the base section along the direction. The base sections of the plurality of antenna panels are disposed in parallel with each other. The tapered slot antenna elements of the plurality of antenna panels provide a plurality of polarizations.

15 Claims, 8 Drawing Sheets

DUAL-POLARIZED ULTRA-WIDEBAND TAPERED SLOT ANTENNA ARRAY WITH INTEGRATED FEED

FIELD

Aspects of the present disclosure relate to radio frequency communications, and more specifically, to configurations of tapered slot antenna elements within antenna arrays.

BACKGROUND

Ultra-wideband (UWB) is a radio technology using low energy levels for short-range communications over a relatively wide bandwidth (e.g., more than 500 MHZ). In this way, a large amount of signal energy may be communicated without interfering with conventional narrowband and carrier wave transmissions occurring in the same frequency band. Some example applications of UWB include radar imaging, consumer electronics, wireless personal area networks, precision locating, and medical electronics.

A tapered slot antenna (also referred to as a "Vivaldi antenna") is a type of end-fire antenna having broadband characteristics making it suitable for use in UWB systems. Tapered slot antennas can be configured for communicating linearly polarized waves or, using perpendicular antenna elements, for communicating using both orthogonal polarizations, circular polarizations, and/or elliptical polarizations. Large phased antenna arrays often require groups of antenna elements, arranged into sub-arrays, to be fed and/or combined in equal power and phase to minimize the overall complexity, size, weight, and power of the system.

SUMMARY

The present disclosure provides an antenna array in one aspect, the antenna array including: a plurality of antenna panels each including, respectively: a substantially planar base section, and at least one tapered slot antenna element projecting in a direction away from an extent of the base section along the direction. The base sections of the plurality of antenna panels are disposed in parallel with each other. The tapered slot antenna elements of the plurality of antenna panels provide a plurality of polarizations.

In one aspect, in combination with any example antenna array above or below, for each of the plurality of antenna panels, the base section and the at least one tapered slot antenna element are integrally formed of a metal material.

In one aspect, in combination with any example antenna array above or below, each tapered slot antenna element of the plurality of antenna panels define a respective slot line between radiating fins of the tapered slot antenna element and extending toward the respective base section. Each of the plurality of antenna panels further includes a respective substrate having a first surface coupled with the base section, and at least one feed including: a microstrip line disposed on an opposing second surface of the substrate and partly overlapping with the slot line, and a via extending through the substrate and coupling the microstrip line with one of the radiating fins.

In one aspect, in combination with any example antenna array above or below, for each of the plurality of antenna panels, the at least one tapered slot antenna element includes a plurality of tapered slot antenna elements disposed along the extent of the base section in the direction. Each of the plurality of antenna panels further includes a respective power divider overlapping with the base section, the power divider coupled with multiple tapered slot antenna elements of the plurality of tapered slot antenna elements.

In one aspect, in combination with any example antenna array above or below, the plurality of antenna panels are arranged in an alternating pattern, such that tapered slot antenna elements of adjacent antenna panels contact each other.

In one aspect, in combination with any example antenna array above or below, for each of the plurality of antenna panels, the at least one tapered slot antenna element includes a plurality of tapered slot antenna elements disposed along the extent of the base section in the direction.

In one aspect, in combination with any example antenna array above or below, the plurality of antenna panels includes a first set of antenna panels providing a first polarization of the plurality of polarizations. Each antenna panel of the first set has the respective plurality of tapered slot antenna elements in a first orientation relative to the plane of the respective base section. The plurality of antenna panels further includes a second set of antenna panels providing a second polarization of the plurality of polarizations. Each antenna panel of the second set has the respective plurality of tapered slot antenna elements in a second orientation relative to the plane of the respective base section. The plurality of antenna panels are arranged in an alternating pattern of the antenna panels of the first set and the second set.

In one aspect, in combination with any example antenna array above or below, the first orientation is coplanar with, or substantially parallel to, the respective plane of the base section, and wherein the second orientation is orthogonal to the respective plane of the base section.

In one aspect, in combination with any example antenna array above or below, each antenna panel of the second set further includes twist sections disposed between the respective base section and the respective plurality of tapered slot antenna elements.

In one aspect, in combination with any example antenna array above or below, for each of the plurality of antenna panels, the plurality of tapered slot antenna elements includes a first set of antenna elements in a first orientation relative to the plane of the respective base section, and a second set of antenna elements in a second orientation relative to the plane of the respective base section. The plurality of tapered slot antenna elements are arranged in an alternating pattern of the antenna elements of the first set and the second set.

In one aspect, in combination with any example antenna array above or below, the first orientation is at a first angle to the respective plane of the base section, and the second orientation is at a second angle complementary to the first angle.

In one aspect, in combination with any example antenna array above or below, each tapered slot antenna element of the plurality of antenna panels define a respective slot line between radiating fins of the tapered slot antenna element and extending into the respective base section. Each of the plurality of antenna panels further includes a first substrate having a first surface coupled with a first surface of the base section, a second substrate having a first surface coupled with an opposing second surface of the base section, and a plurality of microstrip lines disposed on opposing second surfaces of the first substrate and the second substrate. The plurality of microstrip lines is coupled with ones of the radiating fins by vias extending through the first substrate and the second substrate.

The present disclosure provides a tapered slot antenna element in one aspect, the tapered slot antenna element including: a base section disposed in a first plane, two radiating fins coupled with, and projecting upwardly from, the base section and disposed in a different second plane, and a twist section disposed between the base section and the two radiating fins. A slot line extends from between the two radiating fins, through the twist section along a contour thereof, toward the base section.

In one aspect, in combination with any example tapered slot antenna element above or below, the base section, the twist section, and the two radiating fins are integrally formed of a metal material.

In one aspect, in combination with any example tapered slot antenna element above or below, the second plane is orthogonal to the first plane.

The present disclosure provides an antenna panel in one aspect, the antenna panel including: a substantially planar base section, and a first set of tapered slot antenna elements coupled with the base section, and projecting in a direction away from an extent of the base section along the direction. The antenna elements of the first set have a first orientation relative to the plane of the base section. The antenna panel further includes a second set of tapered slot antenna elements coupled with the base section, and projecting in a direction away from an extent of the base section along the direction. The antenna elements of the second set have a different second orientation relative to the plane of the base section.

In one aspect, in combination with any example antenna panel above or below, the antenna panel further includes a first substrate having a first surface coupled with a first surface of the base section, and one or more first feeds. Each of the one or more first feeds includes, respectively, a microstrip line disposed on an opposing second surface of the first substrate and partly overlapping with a slot line. The slot line is defined between radiating fins of a respective tapered slot antenna element and extending toward the base section. Each of the one or more first feeds further includes, respectively, a via extending through the first substrate and coupling the microstrip line with one of the radiating fins.

In one aspect, in combination with any example antenna panel above or below, the antenna panel further includes a second substrate having a first surface coupled with an opposing second surface of the base section, and one or more second feeds. Each of the one or more second feeds includes, respectively, a microstrip line disposed on an opposing second surface of the second substrate and partly overlapping with a slot line. The slot line is defined between radiating fins of a respective tapered slot antenna element and extending toward the base section. Each of the one or more second feeds further includes, respectively, a via extending through the second substrate and coupling the microstrip line with one of the radiating fins.

In one aspect, in combination with any example antenna panel above or below, the one or more first feeds are coupled with the first set of tapered slot antenna elements, and the one or more second feeds are coupled with the second set of tapered slot antenna elements.

In one aspect, in combination with any example antenna panel above or below, the first orientation is at a first angle to the plane of the base section, and the second orientation is at a second angle complementary to the first angle.

BRIEF DESCRIPTION OF THE DRAWINGS

So that the manner in which the above recited features can be understood in detail, a more particular description, briefly summarized above, may be had by reference to example aspects, some of which are illustrated in the appended drawings.

DETAILED DESCRIPTION

Some conventional implementations of dual-polarized tapered slot antenna arrays require a separate high-frequency microwave coaxial connector for each antenna element of the antenna array to connect with backend electronics for power distribution or combination. However, since the ports of the different polarization antenna elements are perpendicular to each other, it is difficult to connect feed network printed circuit boards (PCBs) directly to the ports, as the signal traces on the PCB would crossover and interfere with each other. Thus, connectorized feed network boards may be used and connected to the coaxial connectors of the antenna array using coaxial cables. The number of connectors and cables thus scales up with the number of antenna elements used in the antenna array. Microwave coaxial connectors and cables are relatively expensive, e.g., about 60% of the total cost of the antenna array. Additionally, for larger antenna arrays, managing the cables between the feed network and the antenna array becomes more difficult. Additional transitions between the antenna elements, the coaxial connectors, and the cables also add loss and cause undesirable reflections along the signal paths.

Aspects described herein include configurations of a dual-polarized antenna array having a plurality of antenna panels with substantially planar base sections that are disposed in parallel with each other. In these aspects, the feed network boards may be interfaced directly to the corresponding antenna elements without requiring coaxial connectors and/or cables.

In some aspects, for some of the antenna panels, the tapered slot antenna elements include two radiating fins that are coupled with, and that project upwardly from, the base section and are disposed in a different plane than the base section. The tapered slot antenna elements further include a twist section disposed between the base section and the two radiating fins, and a slot line extends from between the two radiating fins, through the twist section along a contour thereof, toward the base section.

In other aspects, for each of the antenna panels, the plurality of tapered slot antenna elements includes a first set of antenna elements in a first orientation relative to the plane of the respective base section, and a second set of antenna elements in a second orientation relative to the plane of the respective base section. The plurality of tapered slot antenna elements are arranged in an alternating pattern of the antenna elements of the first set and the second set.

Beneficially, use of the various aspects herein allow for more compact implementations of the antenna array while providing similar performance, and significant cost savings due to fewer high-frequency components and/or simplified manufacturing processes.

Figure 1:
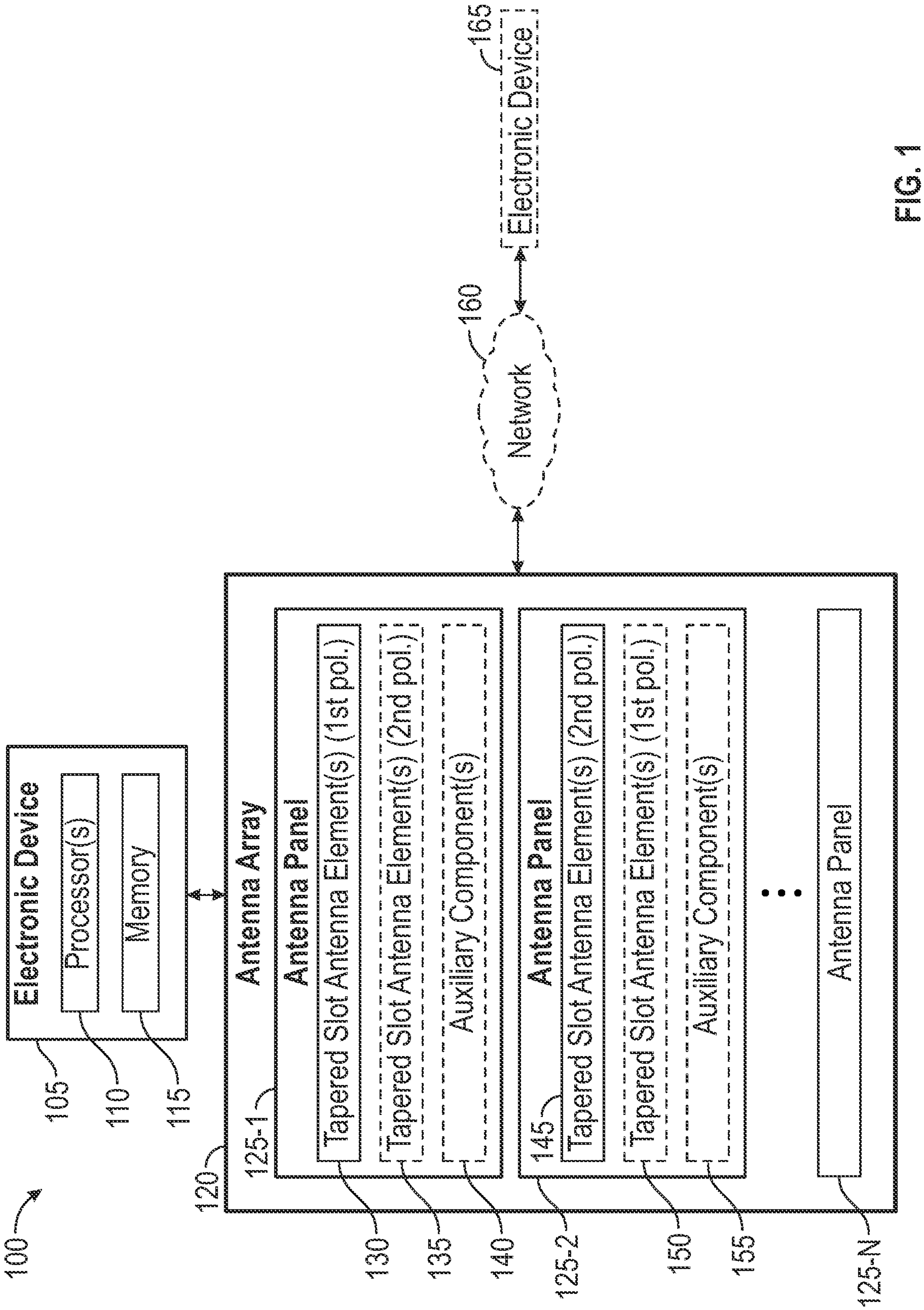
FIG. 1 is a block diagram of an exemplary ultra-wideband (UWB) communication system, according to one or more aspects.

FIG. 1 is a block diagram of an exemplary ultra-wideband (UWB) communication system 100 (also referred to herein as "system 100"), according to one or more aspects. The features of the system 100 may be used in conjunction with other aspects.

The system 100 comprises an electronic device 105 that is communicatively coupled with an antenna array 120. The electronic device 105 comprises one or more processors 110 and a memory 115. The one or more processors 110 are any electronic circuitry, including, but not limited to one or a combination of microprocessors, microcontrollers, application-specific integrated circuits (ASIC), application-specific instruction set processors (ASIP), and/or state machines, that is communicatively coupled to the memory 115 and that controls the operation of the electronic device 105.

The one or more processors 110 may include other hardware that operates software to control and process information. The one or more processors 110 executes software stored in the memory 115 to perform any of the functions described herein. The one or more processors 110 control the operation and administration of the electronic device 105 by processing information (e.g., information received from input devices and/or communicatively coupled electronic devices).

The memory 115 may store, either permanently or temporarily, data, operational software, or other information for the one or more processors 110. The memory 115 may include any one or a combination of volatile or non-volatile local or remote devices suitable for storing information. For example, the memory 115 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 115, a disk, a CD, or a flash drive. In particular embodiments, the software may include an application executable by the one or more processors 120 to perform one or more of the functions described herein.

The electronic device 105 may be implemented in any suitable form, and may provide any suitable functionality within the UWB communication system 100. Some non-limiting examples of the electronic device 105 include a radar controller, a mobile electronic device such as a smartphone, a network device within a wireless personal area network, a medical imaging device, and so forth.

The antenna array 120 is communicatively coupled with the electronic device 105 through one or more conductive connections (e.g., wires, traces, connectors). The antenna array 120 transmits and/or receives wireless signals using its various tapered slot antenna elements, discussed in greater detail below. In some aspects, the one or more processors 110 of the electronic device 105 comprise transmitter circuitry and/or receiver circuitry that transmits and/or receives the wireless signals of the antenna array 120.

Depending on the form of the electronic device 105, in some aspects, the electronic device 105 is communicatively coupled by a network 160 to one or more other electronic devices 165. The network 160 may have any suitable implementation, such as one or more wide area networks (WANs), one or more local access networks (LANs), or combinations thereof. The network 160 comprises infrastructure for communicative capability, such as conductive cabling, wireless transmission, optical transmission, and so forth. The network 160 may further comprise one or more electronic devices providing network functionality and/or services to the network 160, such as routers, firewalls, switches, gateway computers, edge servers, and so forth.

In general terms, the electronic device 165 may have an implementation that is similar to the electronic device 105 (e.g., comprising one or more processors and a memory). The electronic device 165 may be implemented with any suitable form factor, whether relatively static in nature (e.g., mainframe, computer terminal, server, kiosk, workstation) or mobile (e.g., laptop computer, tablet, handheld, smart phone, wearable device). The electronic device 165 may be alternately implemented as a plurality of electronic devices that are communicatively coupled with each other.

The antenna array 120 comprises a plurality of antenna panels 125-1, 125-2, . . . , 125-N (referred to generically or collectively as antenna panel(s) 125). Any suitable number of antenna panels 125 is contemplated. In some aspects, the antenna panels 125 are selectively removable and/or installable in the antenna array 120. In other aspects, the antenna panels 125 are integrated together and/or rigidly installed in the antenna array 120.

Each antenna panel 125 comprises at least one tapered slot antenna element 130, 135, 145, 150 (sometimes referred to as a Vivaldi antenna element or aerial). Each tapered slot antenna element 130, 135, 145, 150 is a planar antenna having characteristics suitable for use in the frequency range of the UWB communications system 100.

Each antenna panel 125, through the respective at least one tapered slot antenna element, provides one or more polarizations of the antenna array 120. In this way, the plurality of tapered slot antenna elements 130, 135, 145, 150 within the antenna array 120 collectively provide a plurality of polarizations of the antenna array 120. In some aspects, a first polarization is orthogonal to a second polarization of the antenna array 120.

In some aspects, the tapered slot antenna element(s) of each antenna panel 125 provides a single polarization. Stated another way, a first set of the antenna panels 125 provide a single first polarization of the antenna array 120, and a second set of the antenna panels 125 provide a single second polarization. For example, the antenna panel 125-1 (included in the first set) includes one or more tapered slot antenna elements 130 having a first polarity, and the antenna panel 125-2 (included in the second set) includes one or more tapered slot antenna elements 145 having a second polarity.

In other aspects, the tapered slot antenna element(s) of each antenna panel 125 provides multiple (e.g., two) polarizations. For example, the antenna panel 125-1 includes one or more tapered slot antenna elements 130 having the first polarity, and one or more tapered slot antenna elements 135 having the second polarity. The antenna panel 125-2 includes one or more tapered slot antenna elements 145 having the second polarity, and one or more tapered slot antenna elements 150 having the first polarity.

Each of the antenna panels 125-1, . . . , 125-N may further comprise one or more auxiliary components 140, 155 that are communicatively coupled with the tapered slot antenna elements 130, 135, 145, 150. The auxiliary components 140, 155 comprise passive components and/or active electronic components that provide analog and/or digital signal processing functionality for the wireless signals that are transmitted and/or received by the tapered slot antenna elements 130, 135, 145, 150. Some non-limiting examples of the auxiliary components 140, 155 include amplifiers, filters, power dividers, and power combiners. In some aspects, the auxiliary components 140, 155 are mounted on, or integrated with, printed circuit board(s) that are attached to base plate(s) that define the tapered slot antenna elements 130, 135, 145, 150.

Figure 2A:
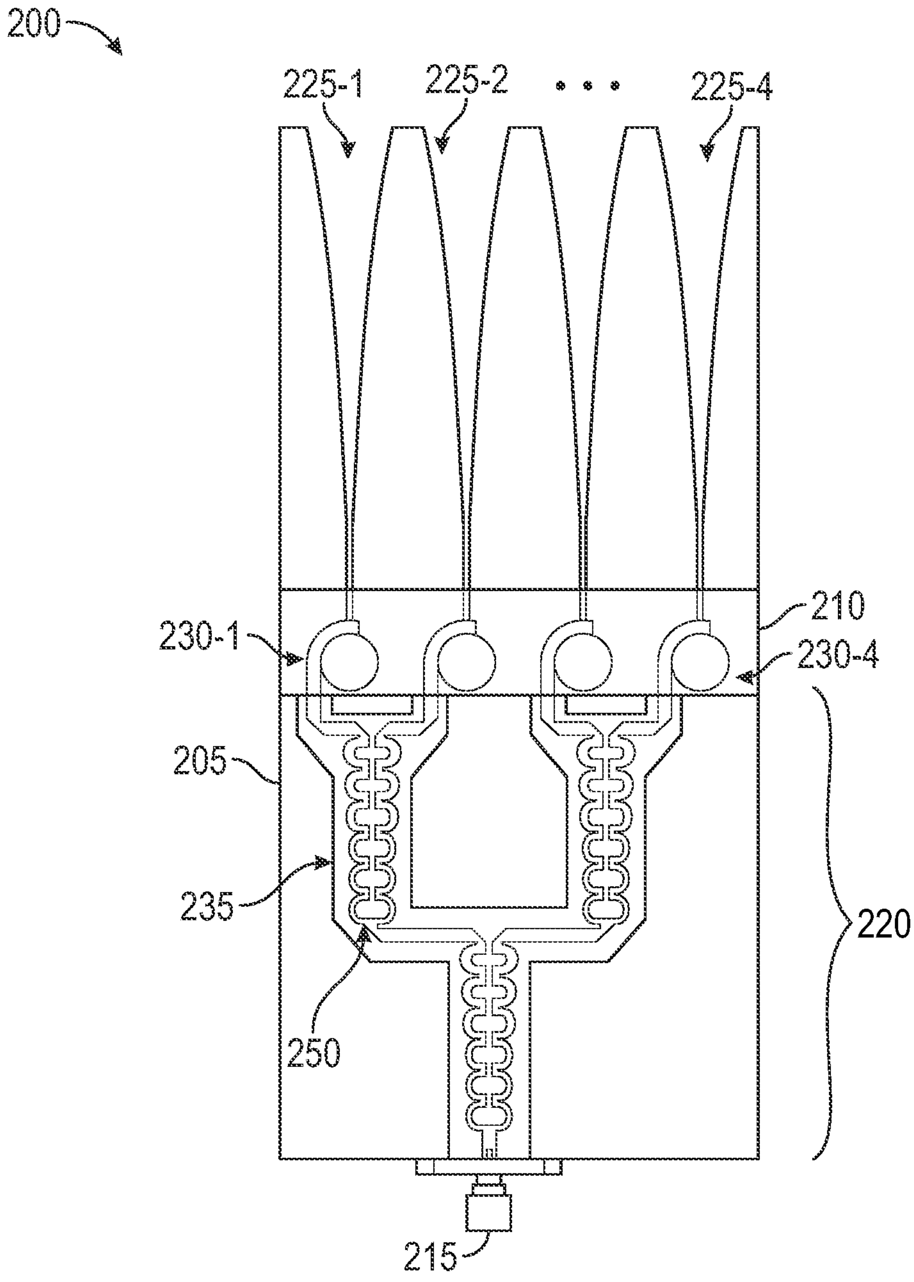
FIG. 2A is a side view of an exemplary antenna panel having multiple tapered slot antenna elements with a first orientation, according to one or more aspects.
Figure 2B:
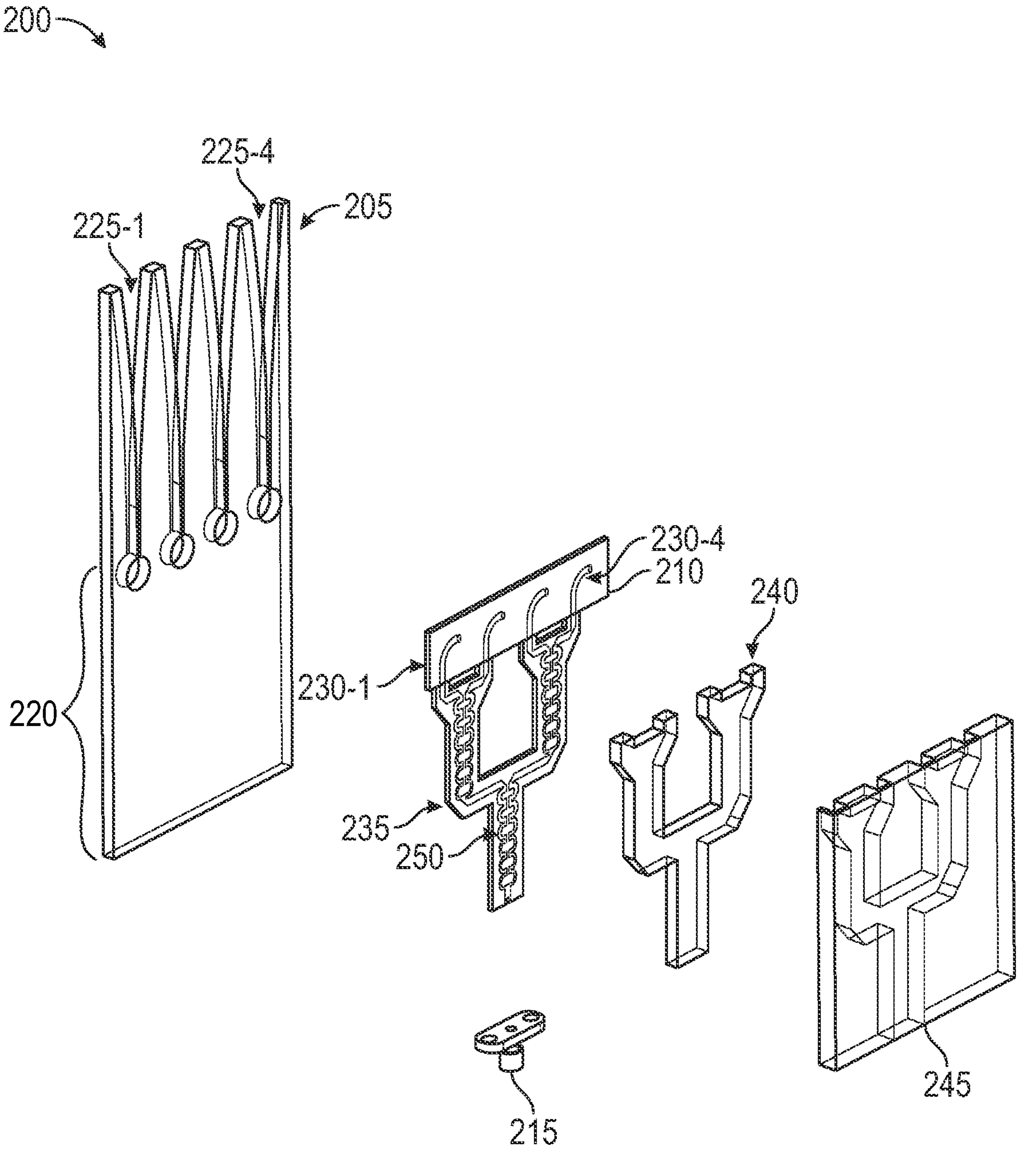
FIG. 2B is an exploded view of an exemplary antenna panel having multiple tapered slot antenna elements with a first orientation, according to one or more aspects.

FIG. 2A is a side view, and FIG. 2B is an exploded view, of an exemplary antenna panel 200 having multiple tapered slot antenna elements with a first orientation, according to one or more aspects. The features of the antenna panel 200 may be used in conjunction with other aspects described herein. For example, one or more instances of the antenna panel 200 may be used to provide a first polarization of the antenna array 120.

The antenna panel 200 comprises a metal plate 205, a substrate 210, a connector 215, a dielectric shield 240, and a metal cover 245. The metal plate 205 may be formed of any suitable metal material, such as aluminum or copper. The metal plate 205 defines a substantially planar base section 220, having opposing planar surfaces and a nominal thickness relative to the other dimensions of the base section 220. The metal plate 205 further defines one or more tapered slot antenna elements, and as shown, a plurality of tapered slot antenna elements 225-1, 225-2, . . . , 225-4 (referred to generically or collectively as tapered slot antenna element(s) 225 or antenna element(s) 225), projecting in a direction away from an extent of the base section 220 along the direction. Described another way, the plurality of tapered slot antenna elements 225-1, 225-2, . . . , 225-4 are disposed along the extent of the base section 220 in the direction. Although four (4) tapered slot antenna elements 225 are shown, other numbers are also contemplated. In some aspects, the base section 220 and the at least one tapered slot antenna element 225 are integrally formed of a metal material.

As shown, each tapered slot antenna element 225 extends in an upward direction from a top of the base section 220, although other relative arrangements of the base section 220 and the tapered slot antenna elements 225 are also contemplated, which can depend on the application of the antenna panel 200. The tapered slot antenna elements 225 have a first orientation relative to the base section 220. In this way, the tapered slot antenna elements 225 each provide a same polarization. As shown, the tapered slot antenna elements 225 and the base section 220 are co-planar with each other.

Each tapered slot antenna element 225 defines radiating fins, and a respective slot line between the radiating fins that extends toward the respective base section 220. In some aspects, the radiating fins of each tapered slot antenna element 225 are symmetrical, and the edges of each radiating fin defining the slot line are tapered according to any suitable tapering function (e.g., linear, exponential). The dimensions of the slot line affect the radiation pattern and the frequency response of the tapered slot antenna element 225. When transmitting, the radiating fins are excited by a radio frequency current, causing electromagnetic waves to radiate from the slot line. The metal plate 205 may be machined to form the tapered slot antenna elements 225, or the metal plate 205 may be formed with the tapered slot antenna elements 225 through additive manufacturing (e.g., 3D metal printing).

The substrate 210 has a first surface that is coupled with the base section 220 of the metal plate 205. As shown, the substrate 210 includes an upper planar section and a lower section. A feed 235 is disposed on an opposing second surface of the substrate 210. In some aspects, the substrate 210 is contoured to overlap the feed 235. such that the substrate 210 overlaps part of the base section 220 and part of the tapered slot antenna elements 225. The substrate 210 may be formed of any material(s) that are suitable for high frequency applications, such as glass microfiber-reinforced PTFE composites (e.g., Rogers RT/duroid 5580).

The feed 235 comprises conductive components that connect the tapered slot antenna elements 225-1, . . . , 225-16 to the connector 215. The feed 235 comprises a plurality of microstrip lines 230-1, . . . , 230-4, and optionally one or more auxiliary components. The substrate 210 is arranged such that each microstrip line 230-1, . . . 230-4 partly overlaps the slot line of a respective one of the tapered slot antenna elements 225-1, . . . , 225-4, typically with an orthogonal orientation. Each microstrip line 230-1, . . . , 230-4 connects to a radiating fin of the respective tapered slot antenna element 225-1, . . . , 225-4 by one or more conductive vias (not shown) extending through the substrate 210.

The feed 235 further comprises a power divider 250 (more specifically, a stripline Wilkinson power divider; one example of the auxiliary component) that is connected to the microstrip lines 230-1, . . . , 230-4 and to the connector 215. The power divider 250 is overlapping with the base section 220.

In some aspects, the power divider 250 may be fabricated contemporaneously with the radiating fins of the tapered slot antenna elements 225, eliminating the need for coaxial connectors and cabling to the microstrip lines 230-1, . . . , 230-4 and removing any variability of connector mating that would impact the performance of the antenna panel 200. Alternate or additional components may be included in the feed 235, such as strip lines, phase shifters, switches, and power amplifiers.

The connector 215 is connected to the feed 235 at a bottom of the metal plate 205 (e.g., at an end opposite the top of the base section 220). The connector 215 may have any suitable implementation, such as a SMA connector or other coaxial connector.

The dielectric shield 240 is arranged between the second surface of the substrate 210 and the metal cover 245, such that the feed 235 is electrically isolated from the metal cover 245. In some aspects, the dielectric shield 240 is contoured to overlap the feed 235 and/or the substrate 210. The dielectric shield 240 may be formed of any suitable material (s), such as PTFE.

The metal cover 245 is dimensioned to overlap the dielectric shield 240, the substrate 210 (and the feed 235 disposed thereon), and the metal plate 205. In some aspects, the metal cover 245 defines a channel that is contoured to overlap the dielectric shield 240, such that the metal cover 245 contacts the metal plate 205. The metal cover 245 may be formed of any suitable material(s), such as aluminum. In some aspects, the metal cover 245 is formed of a same metal material as the metal plate 205.

The various components of the antenna panel 200 may be secured together using any suitable techniques. In some aspects, although not shown, the metal plate 205 and the metal cover 245 may define openings extending partly or fully therethrough, allowing threaded fasteners to attach the metal plate 205 and the metal cover 245. In some aspects, the mechanical pressure exerted between the metal plate 205 and the metal cover 245 supports suitable electrical contact between the microstrip lines 230-1, . . . 230-4 and the radiating fins of the tapered slot antenna elements 225-1, . . . , 225-4, such that no soldering or conductive epoxy is additionally required. In this way, fabrication costs of the antenna panel 200 are decreased, and the potential for variability impacting the performance of the antenna panel 200 is decreased.

Figure 3A:
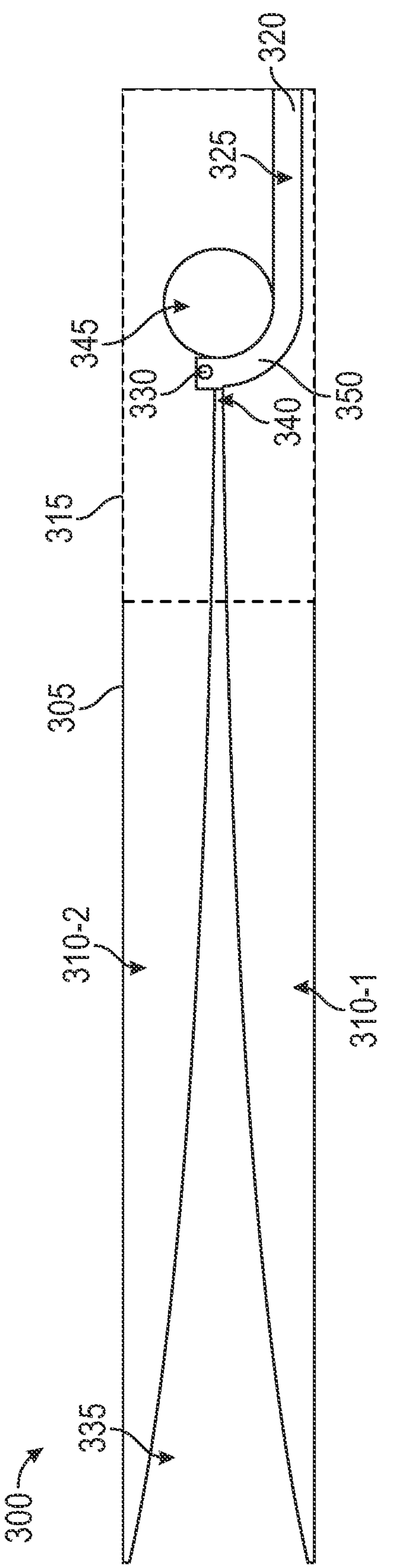
FIG. 3A is a side view of an exemplary tapered slot antenna element with a first orientation, according to one or more aspects.
Figure 3B:
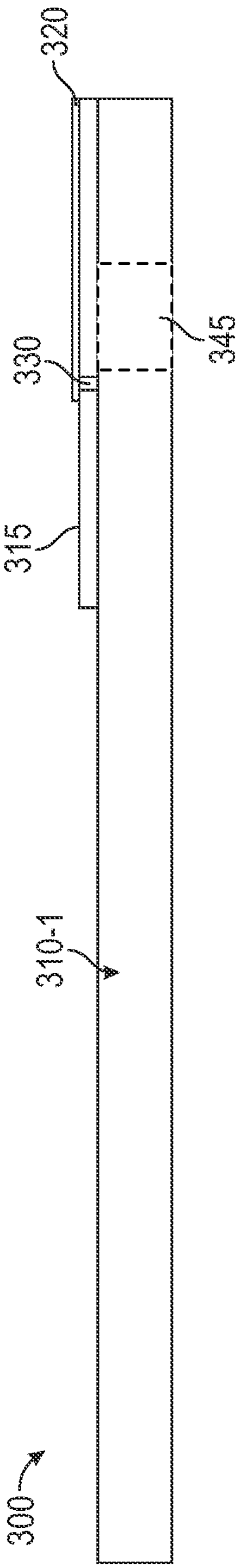
FIG. 3B is an end view of an exemplary tapered slot antenna element with a first orientation, according to one or more aspects.

FIG. 3A is a side view, and FIG. 3B is an end view, of an exemplary tapered slot antenna element 300 with a first orientation, according to one or more aspects. The features of the tapered slot antenna element 300 may be used in conjunction with other aspects. For example, the tapered slot antenna element 300 represents one example implementation of the tapered slot antenna element 225 of FIGS. 2A and 2B.

The tapered slot antenna element 300 comprises two radiating fins 310-1, 310-2 that are spaced apart from each other, and a slot line 335 between the radiating fins 310-1, 310-2 that extends toward the base section (here, toward the right side of the page). In some aspects, the radiating fins 310-1, 310-2 are symmetrical, and the edges of each radiating fin 310-1, 310-2 defining the slot line 335 are tapered according to any suitable tapering function (e.g., linear, exponential). A narrow end 340 of the slot line 335 extends to a matching slot 345 formed in the tapered slot antenna element 300. A first surface of the substrate 315 (one example of the substrate 210) is disposed on the tapered slot antenna element 300, and a microstrip line 320 (one example of the microstrip lines 230-1, . . . 230-4) is disposed on an opposing second surface of the substrate 315.

The matching slot 345 provides impedance matching for the tapered slot antenna element 300 with the microstrip line 320. The matching slot 345 has a circular profile and extends through the tapered slot antenna element 300. The microstrip line 320 includes a straight section 325 and an arcuate section 350 that is contoured with the profile of the matching slot 345. The arcuate section 350 partly overlaps the narrow end 340 of the slot line 335 with a substantially orthogonal orientation. A via 330 extends through the substrate 315 and connects the arcuate section 350 with the radiating fin 310-2.

Figure 4:
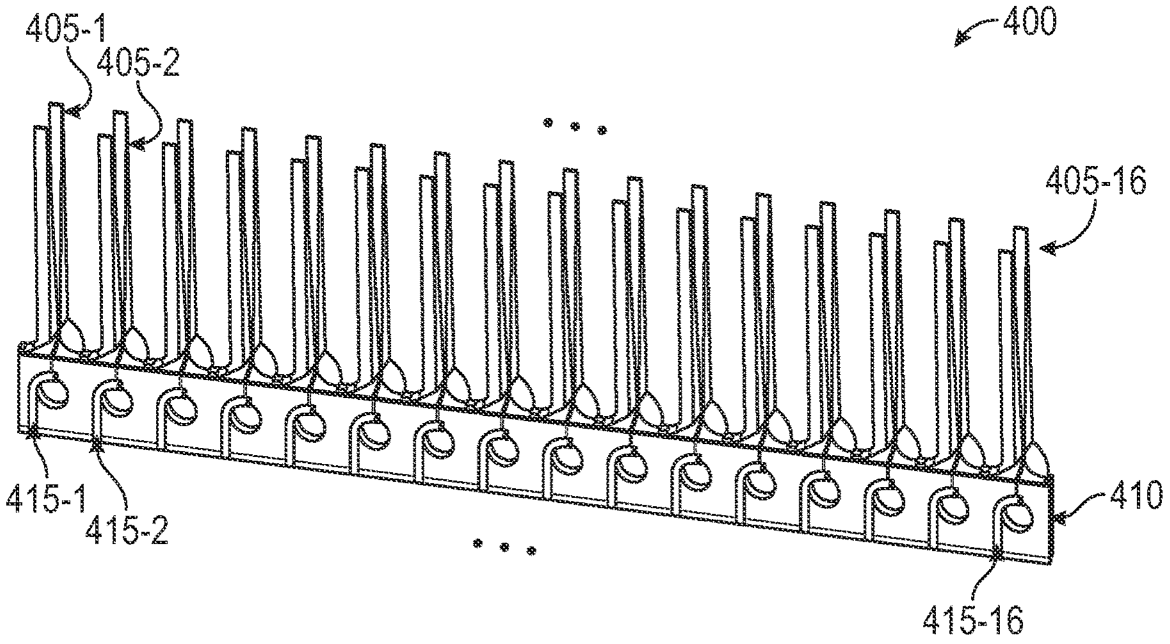
FIG. 4 is a perspective view of a section of an exemplary antenna panel having multiple antenna elements with a second orientation, according to one or more aspects.

FIG. 4 is a perspective view of a section of an exemplary antenna panel 400 having multiple antenna elements with a second orientation, according to one or more aspects. The features of the antenna panel 400 may be used in conjunction with other aspects. For example, the antenna array 120 of FIG. 1 may include one or more antenna panels 200 and one or more antenna panels 400.

The antenna panel 400 comprises a plurality of tapered slot antenna elements 405-1, 405-2, . . . , 405-16 and a substrate 410. Although sixteen (16) tapered slot antenna tapered slot antenna elements 405-1, 405-2, . . . , 405-16 are shown, other numbers are also contemplated. In some aspects, the plurality of tapered slot antenna elements 405-1, 405-2, . . . , 405-16 are formed in a single metal plate, similar to the metal plate 205 of FIGS. 2A, 2B. In some aspects, the substrate 410 is coupled to the metal plate and is similar to the substrate 210 of FIGS. 2A, 2B. A plurality of microstrip lines 415-1, 415-2, . . . , 415-16 are disposed on the substrate 410 on a first surface opposite a second surface contacting the metal plate, corresponding to the plurality of tapered slot antenna elements 405-1, 405-2, . . . , 405-16. Note that only an upper section of the antenna panel 400 is depicted for simplicity, the base section of the metal plate is obscured by the substrate 410, and the lower section of the substrate 410 is not (fully) depicted.

The plurality of tapered slot antenna elements 405-1, 405-2, . . . , 405-16 have a second orientation relative to the base section of the metal plate. In this way, the plurality of tapered slot antenna elements 405-1, 405-2, . . . , 405-16 each provide a same polarization to the antenna array 120. As shown, the plane of each of the tapered slot antenna elements 405-1, 405-2, . . . , 405-16 is orthogonal to the plane of the substrate 410 and to the plane of the base section. Other orientations of the tapered slot antenna elements 405-1, 405-2, . . . , 405-16 relative to the plane of the substrate 410 and/or to the plane of the base section are also contemplated.

Figure 5A:
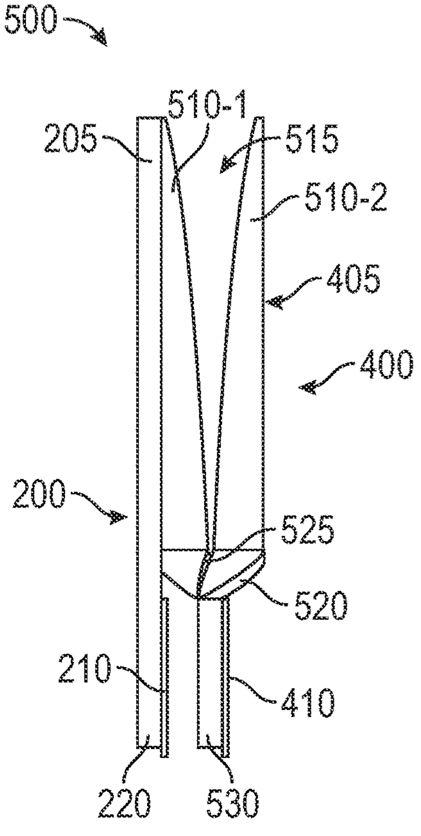
FIG. 5A is an end view of sections of adjacent antenna panels having antenna elements with different orientations, according to one or more aspects.
Figure 5B:
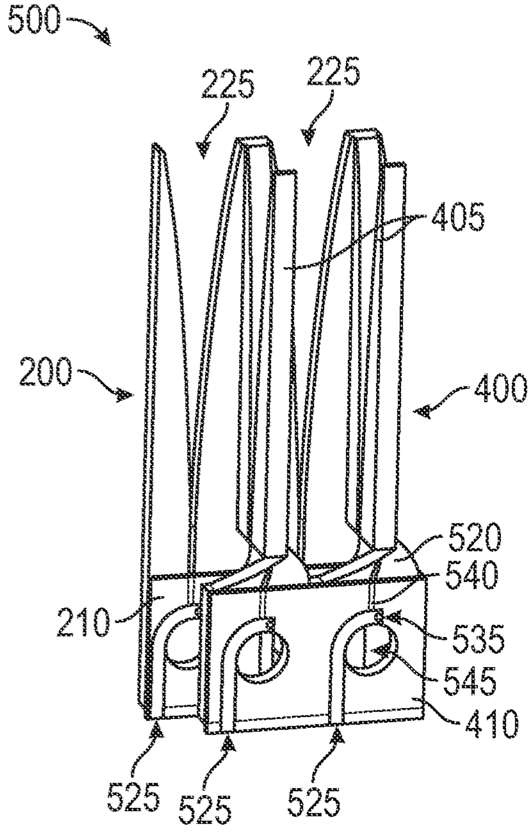
FIG. 5B is a perspective view of sections of adjacent antenna panels having antenna elements with different orientations, according to one or more aspects.

FIG. 5A is an end view, and FIG. 5B is a perspective view, of sections of adjacent antenna panels having antenna elements with different orientations, according to one or more aspects. The arrangement 500 depicted in FIGS. 5A, 5B may be used in conjunction with other aspects. For example, the arrangement 500 includes one antenna panel 200 and one antenna panel 400.

The tapered slot antenna element 405 comprises a base section 530 and the substrate 410. Note that only upper sections of the base section 530 and the substrate 410 are depicted for simplicity. The base section 530 is disposed in a first plane (as shown, orthogonal to the page for the orientation of FIG. 5A). The tapered slot antenna element 405 further comprises two radiating fins 510-1, 510-2 coupled with, and projecting away upwardly from, the base section 530 and disposed in a different second plane (as shown, co-planar or parallel to the page for the orientation of FIG. 5A). The radiating fins 510-1, 510-2 are spaced apart from each other.

The tapered slot antenna element 405 further comprises a twist section 520 disposed between the base section 530 and the two radiating fins 510-1, 510-2. The twist section 520 provides a gradual transition of the tapered slot antenna element 405 between the first plane of the base section 530 and the second plane of the two radiating fins 510-1, 510-2. In some aspects, the transition between the first plane and the second plane is orthogonal.

A slot line 515 extends from between the two radiating fins 510-1, 510-2, through the twist section 520 along a contour 525 thereof, toward the base section 530. In some aspects, the radiating fins 510-1, 510-2 are symmetrical, and the edges of each radiating fin 510-1, 510-2 defining the slot line 515 are tapered according to any suitable tapering function (e.g., linear, exponential). In some aspects, the slot line 515 has a same width through the twist section 520, which may be the same width as at a narrow end 540 of the slot line 515. In other aspects, the width of the slot line 515 decreases as it extends through the twist section 520 toward the base section 530. In some aspects, the narrow end 540 of the slot line 515 extends to a matching slot 545 formed in the tapered slot antenna element 405. The matching slot 545 may be similar to the matching slot 345 of FIG. 3.

In some aspects, the tapered slot antenna element(s) 405 of the antenna panel 400 are formed of a singular metal plate. In some aspects, the metal plate may be machined to form the tapered slot antenna element(s) 405. In some aspects, the metal plate may be formed with the tapered slot antenna element(s) 405 through additive manufacturing (e.g., 3D metal printing).

A first surface of the substrate 410 is disposed on the tapered slot antenna element 405, and a microstrip line 525 (one example of the microstrip lines 230-1, . . . 230-4) is disposed on an opposing second surface of the substrate 410. A via 535 extends through the substrate 410 and connects the microstrip line 525 with the radiating fin 510-1.

In some aspects, the base sections 200, 530 of the plurality of antenna panels 200, 400 are disposed in parallel with each other. The plurality of antenna panels 200, 400 are arranged in an alternating pattern, such that the tapered slot antenna elements 225, 405 of adjacent antenna panels 200, 400 contact each other. A lateral edge of the radiating fin 510-1 (opposite a contoured edge partly defining the slot line 515) contacts a face of one or more radiating fins of the tapered slot antenna elements 225. In some aspects, the lateral edge of the radiating fin 510-1 contacts a section of the metal plate 205 that is common to adjacent tapered slot antenna elements 225 of the antenna panel 200.

Figure 6:
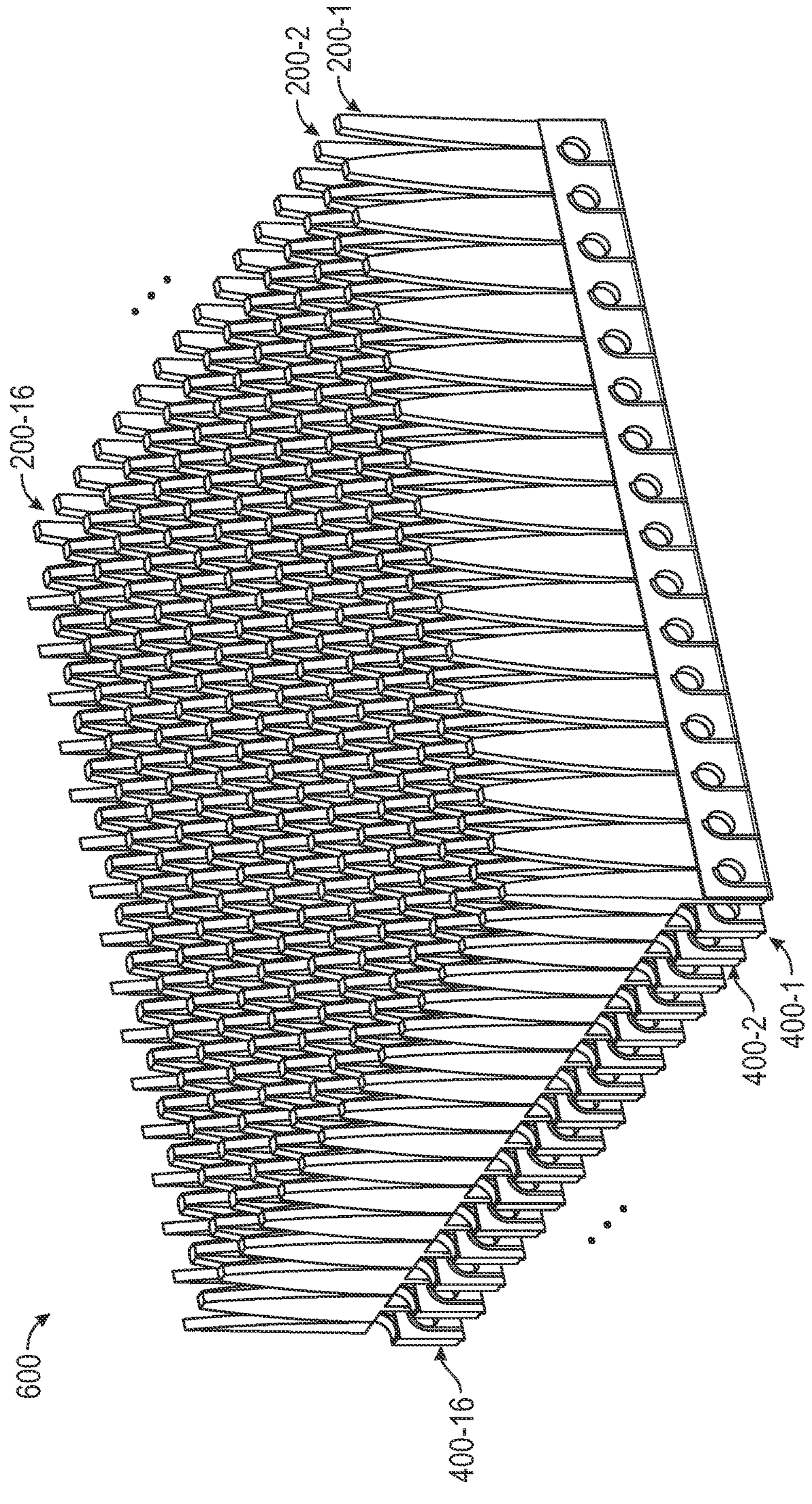
FIG. 6 is a perspective view of an exemplary antenna array having a plurality of antenna panels arranged in an alternating pattern, according to one or more aspects.

FIG. 6 is a perspective view of an exemplary antenna array 600 having a plurality of antenna panels arranged in an alternating pattern, according to one or more aspects. The features of the antenna array 600 may be used in conjunction with other aspects. For example, the antenna array 600 includes sixteen (16) antenna panels 200-1, 200-2, . . . , 200-16 and sixteen (16) antenna panels 400-1, 400-2, . . . , 400-16 arranged in an alternating pattern. Note that only an upper section of the antenna array 600 is depicted for simplicity, such that the base sections of the respective metal plates and the lower sections of the respective substrates are not (fully) depicted. Beneficially, the antenna array 600 may be constructed with a more compact implementation and/or with significant cost savings due to fewer high-frequency components and/or simplified manufacturing processes.

Figure 7:
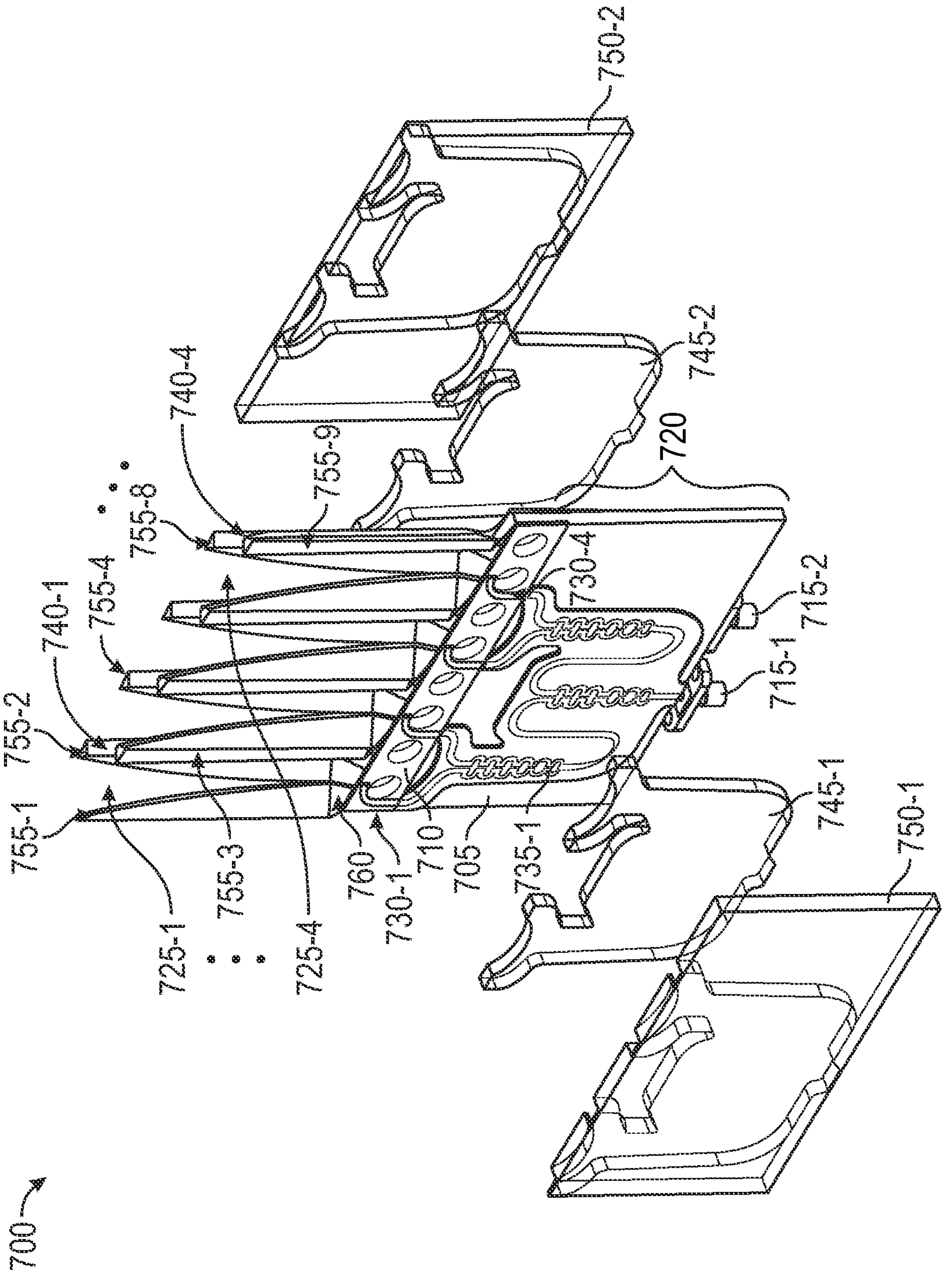
FIG. 7 is an exploded view of an exemplary antenna panel having multiple tapered slot antenna elements with different orientations, according to one or more aspects.

FIG. 7 is an exploded view of an exemplary antenna panel 700 having multiple tapered slot antenna elements with different orientations, according to one or more aspects. The features of the antenna panel 700 may be used in conjunction with other aspects.

The antenna panel 700 comprises a substantially planar base section 720, a first set of tapered slot antenna elements 725-1, . . . , 725-4 coupled with the base section 720, and a second set of tapered slot antenna elements 740-1, . . . , 740-4 coupled with the base section 720. The first set of tapered slot antenna elements 725-1, . . . , 725-4 and the second set of tapered slot antenna elements 740-1, . . . , 740-4 project in a direction away from an extent of the base section 720 along the direction. As shown, the direction is a vertical direction, and the extent of the base section 720 along the direction is a top of the base section 720. Other directions and relative orientation of the base section 720 and the tapered slot antenna elements 725-1, . . . , 725-4, 740-1, . . . , 740-4 are also contemplated.

The antenna panel 700 comprises a plurality of radiating fins 755-1, 755-2, . . . , 755-9 that are arranged as two rows along the length of the base section 720. A first row includes the odd-indexed radiating fins 755-1, 755-3, . . . , 755-9, and a second row includes the even-indexed radiating fins 755-2, 755-4, . . . , 755-8. The plurality of radiating fins 755-1, 755-2, . . . , 755-9 collectively define the tapered slot antenna elements 725-1, . . . 725-4, 740-1, . . . , 740-4. In some aspects, one or more or the radiating fins 755-1, . . . , 755-9 are shared by multiple ones of the tapered slot antenna elements 725-1, . . . , 725-4, 740-1, . . . , 740-4. For example, the tapered slot antenna element 725-1 includes the radiating fins 755-1, 755-2, the tapered slot antenna element 740-1 includes the radiating fins 755-2, 755-3, and so forth.

In some aspects, the base section 720 and the tapered slot antenna elements 725-1, . . . , 725-4, 740-1, . . . , 740-4 are integrally formed of a metal material. As shown, the base section 720 and the tapered slot antenna elements 725-1, . . . , 725-4, 740-1, . . . , 740-4 are formed of a singular metal plate 705, e.g., by machining or 3D printing.

The tapered slot antenna elements 725-1, . . . , 725-4 of the first set have a first orientation relative to a plane of the base section 720, and the tapered slot antenna elements 740-1, . . . 740-4 of the second set have a different second orientation relative to the plane of the base section 720. In some aspects, the first orientation is at a first angle to the plane of the base section 720, and the second orientation is at a second angle complementary to the first angle. As shown in FIG. 7, the first angle is +45 degrees, and the second angle is −45 degrees {45, −45}. Other relative orientations are also contemplated, such as {0, 90}, {90, 0}, {30, −60}, {60, −30}, and so forth.

The antenna panel 700 further comprises a first substrate 710 having a first surface coupled with a first surface of the base section 720, and one or more first feeds 735-1. Each first feed 735-1 comprises, respectively, a microstrip line 730-1, . . . , 730-4 disposed on an opposing second surface of the first substrate 710 and partly overlapping with a slot line defined between the radiating fins radiating fins 755-1, 755-2, . . . , 755-9 of a respective tapered slot antenna element 725-1, . . . , 725-4 and extending toward the base section 720. Each first feed 735-1 further comprises a via extending through the first substrate 710 and coupling the microstrip line 730-1, . . . , 730-4 with one of the radiating fins 755-1, 755-2, . . . , 755-9.

In some aspects, some or all of the tapered slot antenna elements 725-1, . . . , 725-4, 740-1, . . . , 740-4 include a respective twist section 760 and the respective radiating fins 755-1, 755-2, . . . , 755-9. The twist section 760 provides a gradual transition of the tapered slot antenna element 725-1, . . . , 725-4, 740-1, . . . , 740-4 between the first plane of the base section 720 and the second plane of the respective radiating fins 755-1, 755-2, . . . , 755-9 of the tapered slot antenna element 725-1, . . . , 725-4, 740-1, . . . , 740-4. In some aspects, and as shown, the transition between the first plane and the second plane is ±45 degrees. Thus, for each of the tapered slot antenna elements 725-1, . . . , 725-4, 740-1, . . . , 740-4, a respective slot line extends from between the corresponding radiating fins 755-1, 755-2, . . . , 755-9, through the corresponding twist section 760 along a contour thereof, toward the base section 720.

The antenna panel 700 further comprises a first connector 715-1, a first dielectric shield 745-1, and a first metal cover 750-1. In some aspects, the first connector 715-1 represents a first instance of the connector 215, the first dielectric shield 745-1 represents a first instance of the dielectric shield 240, and the first metal cover 750-1 represents a first instance of the metal cover 245.

The antenna panel 700 further comprises a second substrate (not shown) having a first surface coupled with an opposing second surface of the base section 720, and one or more second feeds (not shown). Each second feed comprises microstrip line(s) disposed on an opposing second surface of the second substrate and partly overlapping with a slot line defined between radiating fins of a respective tapered slot antenna element 740-1, . . . , 740-4 and extending toward the base section 720. Each second feed further comprises a via extending through the second substrate and coupling the microstrip line(s) with one of the radiating fins.

The antenna panel 700 further comprises a second connector 715-2, a second dielectric shield 745-2, and a second metal cover 750-2. In some aspects, the second connector 715-2 represents a second instance of the connector 215, the second dielectric shield 745-2 represents a second instance of the dielectric shield 240, and the second metal cover 750-2 represents a second instance of the metal cover 245.

In this way, the one or more first feeds 735-1 are coupled with the first set of tapered slot antenna elements tapered slot antenna elements 725-1, . . . , 725-4, and the one or more second feeds are coupled with the second set of tapered slot antenna elements 740-1, . . . , 740-4. Thus, the tapered slot antenna elements 725-1, . . . , 725-4, 740-1, . . . , 740-4 of the antenna panel 700 provides multiple (e.g., two) polarizations.

Figure 8:
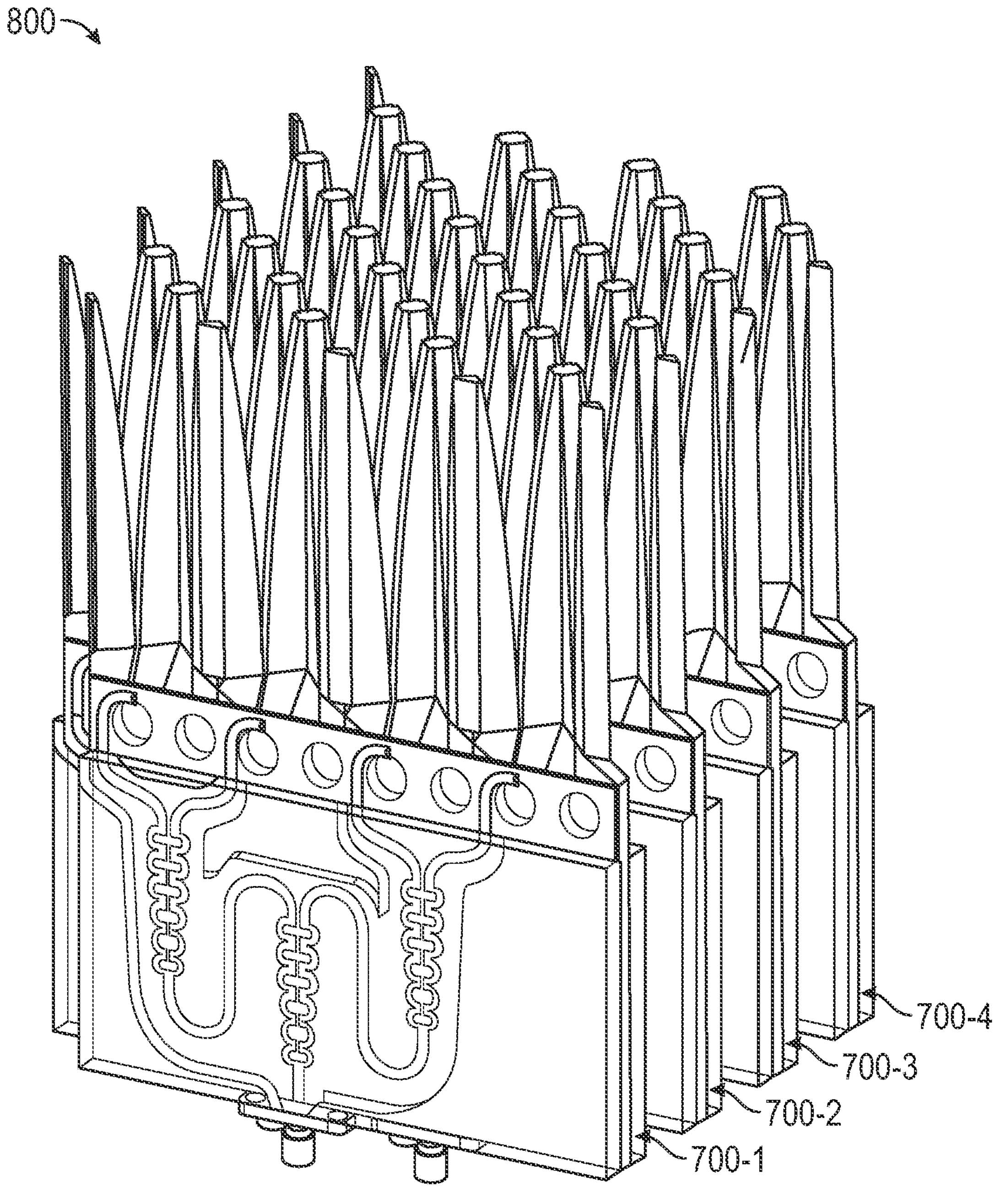
FIG. 8 is a perspective view of an exemplary antenna array having a plurality of antenna panels arranged in an alternating pattern, according to one or more aspects.

Turn now to FIG. 8, which provides a perspective view of an exemplary antenna array 800 having a plurality of antenna panels 700-1, 700-2, 700-3, 700-4 arranged in an alternating pattern, according to one or more aspects. The features of the antenna array 800 may be used in conjunction with other aspects. For example, each of the antenna panels 700-1, 700-2, 700-3, 700-4 represents a respective instance of the antenna panel 700.

In some aspects, the base sections 720 of the antenna panels 700-1, 700-2, 700-3, 700-4 are disposed in parallel with each other. The antenna panels 700-1, 700-2, 700-3, 700-4 are arranged in an alternating pattern, such that the tapered slot antenna elements 725-1, . . . , 725-4, 740-1, . . . , 740-4 of adjacent antenna panels 700-1, 700-2, 700-3, 700-4 contact each other.

Returning to FIG. 7, some or all of the radiating fins 755-1, 755-2, . . . 755-9 of the tapered slot antenna elements 725-1, . . . , 725-4, 740-1, . . . , 740-4 has an outer edge that contacts a corresponding outer edge of a radiating fin fins 755-1, 755-2, . . . 755-9 of a tapered slot antenna element 725-1, . . . , 725-4, 740-1, . . . , 740-4 in an adjacent antenna panel 700. In some aspects, some or all of the radiating fins 755-1, 755-3, . . . , 755-9 of the first row have outer edges within a first plane, and some or all of the radiating fins 755-2, 755-4, . . . , 755-8 of the second row have outer edges within a second plane. In some aspects, the first plane and the second plane are co-planar with, or parallel to, the plane of the base section 720. In this way, and using the antenna array 800 as an example, the first row radiating fins of the antenna panel 700-2 contact the second row radiating fins of the adjacent antenna panel 700-1, and the second row radiating fins of the antenna panel 700-2 contact the first row radiating fins of the adjacent panel 700-3.

In the current disclosure, reference is made to various aspects. However, it should be understood that the present disclosure is not limited to specific described aspects. Instead, any combination of the following features and elements, whether related to different aspects or not, is contemplated to implement and practice the teachings provided herein. Additionally, when elements of the aspects are described in the form of "at least one of A and B," it will be understood that aspects including element A exclusively, including element B exclusively, and including element A and B are each contemplated. Furthermore, although some aspects may achieve advantages over other possible solutions and/or over the prior art, whether or not a particular advantage is achieved by a given aspect is not limiting of the present disclosure. Thus, the aspects, features, aspects and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects described herein may be embodied as a system, method or computer program product. Accordingly, aspects may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects described herein may take the form of a computer program product embodied in one or more computer readable storage medium (s) having computer readable program code embodied thereon.

Program code embodied on a computer readable storage medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to aspects of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various aspects of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While the foregoing is directed to aspects of the present disclosure, other and further aspects of the disclosure may be devised without departing from the basic scope thereof, and the scope thereof is determined by the claims that follow.

What is claimed is:

1. An antenna array comprising:

a plurality of antenna panels, each antenna panel of the plurality of antenna panels comprising, respectively:

a substantially planar base section, wherein base sections of the plurality of antenna panels are disposed in parallel with each other; and a set of tapered slot antenna elements projecting in a direction away from an extent of the base section along the direction, wherein the set of tapered slot antenna elements provide one or more polarizations and wherein the set of tapered slot antenna elements comprises:

a first subset of tapered slot antenna elements coupled with the base section, and having a first orientation relative to a plane of the base section; and a second subset of tapered slot antenna elements coupled with the base section, and projecting in a direction away from an extent of the base section along the direction, and having a second orientation relative to the plane of the base section, wherein the second orientation is different from the first orientation;

a first substrate having a first surface coupled with a first surface of the base section; and one or more first feeds, each first feed of the one or more first feeds comprising, respectively:

a first microstrip line disposed on an opposing second surface of the first substrate and partly overlapping with a first slot line, the first slot line defined between radiating fins of a respective tapered slot antenna element, of the set of tapered slot antenna elements, and extending toward the base section; and a first via extending through the first substrate and coupling the first microstrip line with a radiating fin of the radiating fins.

2. The antenna array of claim 1, wherein, for each antenna panel of the plurality of antenna panels, the base section and the set of tapered slot antenna elements are integrally formed of a metal material.

3. The antenna array of claim 1, wherein, for each antenna panel of the plurality of antenna panels, the set of tapered slot antenna elements are disposed along the extent of the base section in the direction, and wherein each antenna panel of the plurality of antenna panels further comprises, respectively:

a power divider overlapping with the base section, the power divider coupled with multiple tapered slot antenna elements of the set of tapered slot antenna elements.

4. The antenna array of claim 1, wherein the plurality of antenna panels are arranged in an alternating pattern, such that tapered slot antenna elements of adjacent antenna panels contact each other.

5. The antenna array of claim 1, wherein, for each antenna panel of the plurality of antenna panels:

the base section is disposed in a first plane;

the radiating fins are coupled with, and project upwardly from, the base section and are disposed in a different second plane; and a twist section is disposed between the base section and the radiating fins, wherein the first slot line extends from between the radiating fins, through the twist section and along a contour of the twist section, toward the base section.

6. The antenna array of claim 5, wherein the base section, the twist section, and the radiating fins are integrally formed of a metal material.

7. The antenna array of claim 5, wherein the second plane is orthogonal to the first plane.

8. The antenna array of claim 1, wherein each antenna panel of the plurality of antenna panels comprises, respectively:

a second substrate having a first surface coupled with an opposing second surface of the base section; and one or more second feeds, each second feed of the one or more second feeds comprising, respectively:

a second microstrip line disposed on an opposing second surface of the second substrate and partly overlapping with a second slot line, the second slot line defined between radiating fins of a respective tapered slot antenna element, of the set of tapered slot antenna elements, and extending toward the base section; and a second via extending through the second substrate and coupling the second microstrip line with a radiating fin of the radiating fins.

9. The antenna array of claim 8, wherein the one or more first feeds are coupled with a first subset of tapered slot antenna elements, and the one or more second feeds are coupled with a second subset of tapered slot antenna elements.

10. The antenna array of claim 1, wherein the first orientation is at a first angle to the plane of the base section, and wherein the second orientation is at a second angle complementary to the first angle.

11. The antenna array of claim 9, wherein the first subset of tapered slot antenna elements are coupled with the base section and have a first orientation relative to a plane of the base section;

wherein the second subset of tapered slot antenna elements are coupled with the base section, project in a direction away from an extent of the base section along the direction, and have a second orientation relative to the plane of the base section; and wherein the second orientation is different from the first orientation.

12. An antenna array comprising:

a plurality of antenna panels, each antenna panel of the plurality of antenna panels comprising, respectively:

a substantially planar base section, wherein base sections of the plurality of antenna panels are disposed in parallel with each other;

a first substrate having a first surface coupled with a first surface of the base section;

a set of tapered slot antenna elements projecting in a direction away from an extent of the base section along the direction, wherein the set of tapered slot antenna elements provide one or more polarizations, wherein the set of tapered slot antenna elements are disposed along the extent of the base section in the direction, wherein the set of tapered slot antenna elements comprise:

a first subset of tapered slot antenna elements in a first orientation relative to a plane of the base section, and a second subset of tapered slot antenna elements in a second orientation relative to the plane of the base section; and wherein the set of tapered slot antenna elements are arranged in an alternating pattern of tapered slot antenna elements of the first subset of tapered slot antenna elements and the second subset of tapered slot antenna elements; and a second substrate having a first surface coupled with an opposing second surface of the base section;

a plurality of radiating fins; and a plurality of first feeds, wherein the plurality of first feeds include a plurality of first microstrip lines disposed on opposing second surfaces of the first substrate and the second substrate, the plurality of first microstrip lines coupled with the plurality of radiating fins by first vias extending through the first substrate and the second substrate.

13. The antenna array of claim 12, wherein the first orientation is coplanar with, or substantially parallel to, the plane of the base section, and wherein the second orientation is orthogonal to the plane of the base section.

14. The antenna array of claim 13, wherein each antenna panel of the set of antenna panels further comprises, respectively:

twist sections disposed between the base section and the set of tapered slot antenna elements.

15. The antenna array of claim 12, wherein the first orientation is at a first angle to the plane of the base section, and wherein the second orientation is at a second angle complementary to the first angle.

* * * * *